Patented June 30, 1936

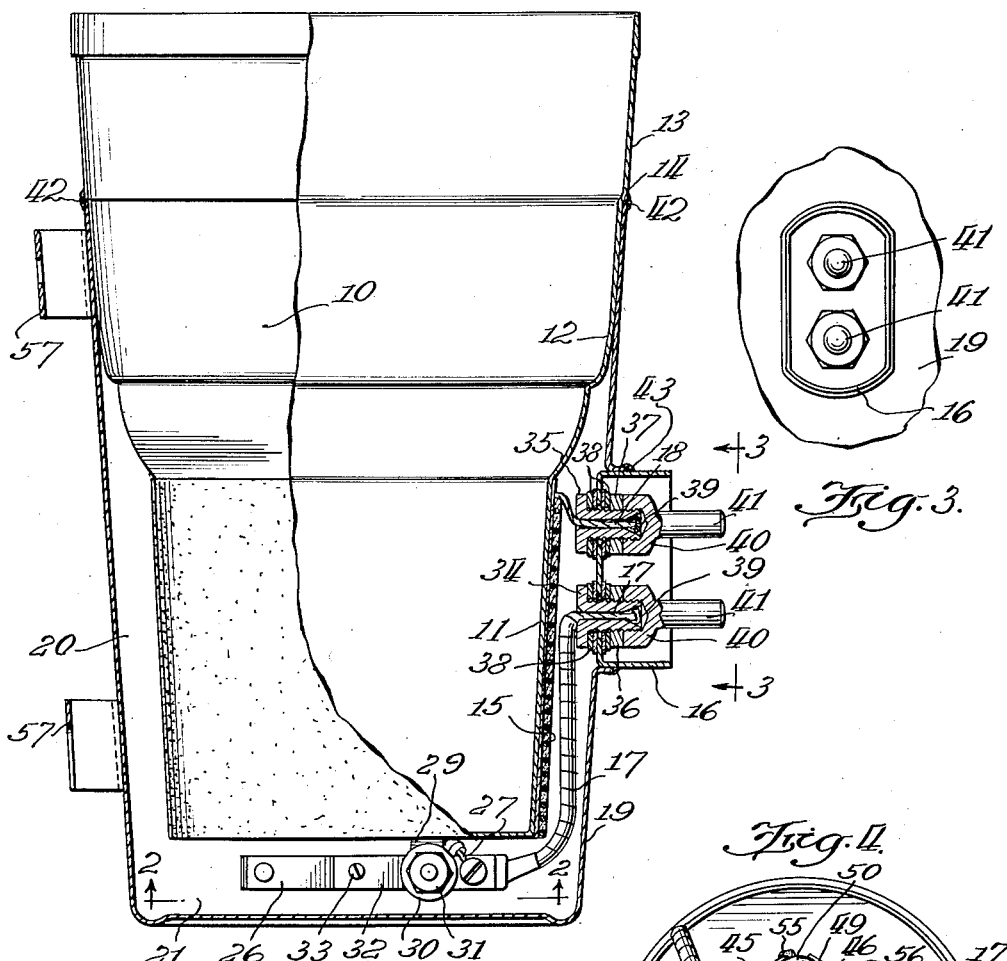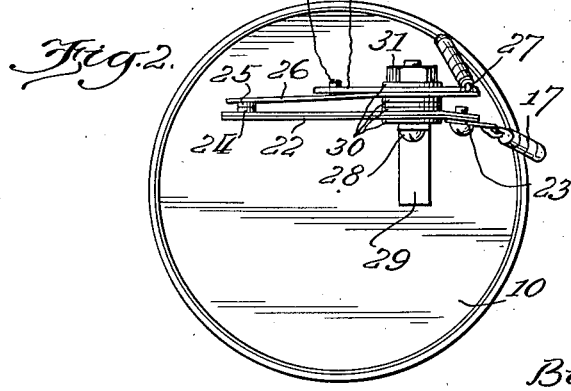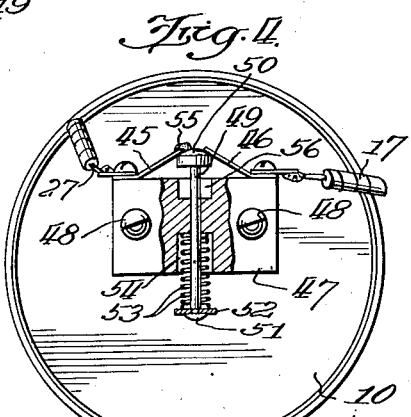

2,046,125

UNITED STATES PATENT OFFICE 2,046,125

ELECTRICALLY HEATED CUP

Herman E. Lacy, Chicago, Ill.

Application July 22, 1935, Serial No. 32,504

1 Claim. (Cl. 219—43)

The invention relates generally to a heating utensil, and more particularly to an electrically self-heating cup designed especially for use upon one or more known types of drink mixers, whereby the contents thereof may be heated by heat supplied to it from an electrical heating resistance element associated therewith. These devices generally include inner and outer cup members spaced from each other to provide an intervening air space and the electrical heating element provided around the inner cup member adjacent the lower portion thereof with the terminals leading from the heating element being disposed in a socket provided therefor and mounted in the outer cup member.

In devices of this character heretofore employed, there have been present several distinct disadvantages, the more important of which were the impracticability to disassemble the cup from its outer shell when repairs become necessary to the heating element. Thus, any injury caused to the heating element, such, for example, as by overheating or the like would render the cup useless and the same would have to be discarded.

Another decided disadvantage resided in the fact that in the devices heretofore employed for this purpose no means were provided for automatically shutting off the supply of current to the heating element should the temperature of the contents in the cup become too high, with the result that the heating element would eventually be destroyed or the cup otherwise damaged so it would not be of any further use.

A still further disadvantage resided in the fact that the terminals leading from the heating elements were unprotected against arcing with the result that only after a short period of use said terminals would burn out, thus permitting moisture and air to get into the intervening air space between the inner and outer shell members, thus causing erosion and ultimately impairing the insulation around the heating element.

It is an object of this invention to provide a heating cup of the character described which will overcome all of the above mentioned disadvantages to which end a feature of the invention consists in a cup so constructed that the inner and outer shells may be readily disassembled whenever it becomes necessary or desirable to repair or replace the heating element.

Another object of the invention is to provide in a device of the character described novel and improved means for automatically interrupting the supply of current to the heating element upon a certain predetermined temperature being reached within said cup member.

Another object of this invention is to provide in a device of the character described novel and improved mechanism for mounting and shielding the terminals leading from the heating element, whereby the same will be protected against injury due to arcing in the making and breaking of the electrical connection to said heating element.

A still further object of the invention is to provide in a device of the character described a pair of cup members telescopically received one within the other, the inner cup member having a flaring portion extending above the uppermost free edge of the outer cup member, said flaring portion being provided with an annular bead or flange which is adapted to rest upon the upper free edge of the outer cup member and to support said inner cup member in operative assembled position.

A still further object of the invention is to provide a novel and improved self-heating cup which will be simple in construction and operation, which may be readily assembled and disassembled, which may be constructed along lines convenient for low cost manufacture, and which will be highly efficient for carrying out the purposes for which it is designed.

With the foregoing and other objects in view which will appear as the description proceeds, the invention consists in certain novel features of construction, arrangement and combination of parts hereinafter fully described, illustrated in the accompanying drawing, and particularly pointed out in the appended claim, it being understood that various changes in the form, proportion, size and minor details of the structure may be made without departing from the spirit or sacrificing any of the advantages of the invention.

For the purpose of facilitating an understanding of my invention, I have illustrated in the accompanying drawing, a preferred embodiment thereof, from an inspection of which when considered in connection with the following description, my invention, its mode of construction, assembly and operation, and many of its advantages should be readily understood and appreciated.

Referring to the drawing in which the same characters of reference are employed to indicate corresponding or similar parts throughout the several figures of the drawing:

Figure 1 is a longitudinal sectional view through a self-heating cup embodying the principles of my invention;

Fig. 2 is a bottom plan view of the inner cup member looking in the direction of the arrow 2—2 of Fig. 1;

Fig. 3 is a plan view of the socket carrying the terminals of the heating element looking in the direction of the arrow 3—3 of Fig. 1; and Fig. 4 is a bottom plan view of the inner cup member with a somewhat modified form of cut-off associated therewith.

Referring to the drawing more specifically by characters of reference, the numeral 10 designates generally an inner container of suitable form, and as illustrated in the drawing, the preferred form includes a lower portion 11 of reduced diameter and the flaring upper portions 12 and 13. At the juncture of the flaring portions 12 and 13 is provided an annular outer flange or bead 14 for a purpose to be presently more fully described.

The reduced portion 11 has the heating element 15 mounted thereon, which element preferably consists of an electrical heating resistance which is supplied with electric current through means of a flexible conductor (not shown) associated with the cup in any suitable way, and preferably releasably, as by providing a socket 16 that is mounted on the cup within which socket are disposed the terminals 17 and 18 leading from the heating element. The container 10 is received in an outer shell 19 with the annular flange or bead 14 of the inner container resting upon the uppermost free edge of the shell 19 when the said containers 10 and 19 are in their assembled operative position, thus leaving the flaring portion 13 of the inner container to project beyond the outer free edge of the outer shell.

The lower reduced portion 11 of the inner container is spaced a considerable distance from the outer shell 19 to provide a suitable intervening air space 20, which space will help to heat insulate the outer shell from the heating element 15. The lower edge or bottom wall of the inner container is also spaced from the bottom wall of the outer shell, thus providing the intervening air space 21 which will facilitate in heat insulating the bottom wall of the outer shell.

In practice, the spaces 20 and 21 have the air withdrawn therefrom to create a partial vacuum therein in which position the said air spaces are sealed to thereby prevent the ingress of air or moisture, either one of which may result in injury to the heating element.

In order to prevent injury to my improved device by overheating or the like, I have provided in association with the heating element a bi-metallic thermostat generally designated by the reference character 22, to which thermostat is connected the terminal 17, as shown at 23. The thermostat 22 has a contact 24 provided thereon which is normally held in engagement with a contact 25 provided on the conducting arm 26, to which arm is connected, as shown at 27, one end of the resistance element 15.

The members 22 and 26 are carried on a bolt 28 which is secured to a bracket 29, the latter being permanently fastened to the underside of the bottom wall of the inner container 10. The members 22 and 26 are insulated from each other and from the bolt 28 by a plurality of mica washers 30 or the like and the whole assembly is rigidly maintained on the bolt 28 by means of a nut 31 threaded on the free end of the bolt. Disposed immediately adjacent the arm 26 is a member 32, which member is in electrical contacting engagement at all times with a portion of the arm 26 and which has an adjusting screw 33 threaded therein adjacent one end thereof whereby the distance between the contacting portions of the members 22 and 26 may be readily adjusted to desired proportions.

From the above it will be noted that the members 22 and 26 will be normally held in electrical contacting engagement with each other, in which position they will remain until a predetermined temperature has been reached at which time the bi-metallic member 22 will flex away from the member 26, thereby breaking the contact 24—25 and interrupting the current supply to the heating element.

As shown in the drawing, the free ends of the terminals 17 and 18 of the heating element are received in passages extending through members 34 and 35, respectively, which members are rigidly secured in the socket member 16 mounted in the outer shell 19, said members 34 and 35 being held in place in the socket members by means of the screws 36 and 37. Suitable mica washers 38 are employed for insulating the said members 34 and 35 from the socket member 16. The openings provided in the members 34 and 35 are flared adjacent their outer ends and are adapted for receiving a drop of solder or the like by means of which the free ends of the terminals may be secured in place within their respective members, as shown at 39.

In order to protect the free ends of said terminals from arcing which may eventually destroy the solder 39 and thus permit the entry of both air and moisture into the air space 20, I provide for the free ends of said members 34 and 35 suitable caps 40 which are threaded on the free ends of said members 34 and 35, said caps having the projections or prongs 41 which are adapted for reception in the plug, (not shown) when the latter is disposed in the socket 16.

When all of the parts have been assembled as above described, the various parts are further secured to each other and the intervening air space completely sealed by providing a bead of solder, as shown at 42, at the point where the uppermost free edge of the outer shell contacts the lowermost edge of the flaring portion 13. Similarly, a bead of solder, as shown at 43, is provided around the joint formed between the socket 16 and the opening in the outer shell within which the socket is received.

Thus, when the cup is fully assembled, the intervening air spaces 20 and 21 are fully protected against the ingress of air or moisture. However, should anything happen to the heating element 15 or the inner container so that it becomes necessary or desirable to repair the same, it is a comparatively simple matter to disassemble the inner member from its outer shell. This may be accomplished by applying a blow torch or the like to the beads of solder 42 and 43, removing the socket 16 from the outer shell and then withdrawing the inner member by exerting a pull on the flaring portion 13 while holding the outer shell. The provision of the projecting upper flaring portion 13 beyond the uppermost edge of the outer shell makes possible the removal or disassembly of said inner and outer members from each other with comparative ease.

In the form illustrated in Fig. 4, a mechanism is provided to replace the thermostat element shown in Fig. 2, whereby the supply of current may be interrupted whenever the temperature becomes too great. This device is adapted for use where it is not possible to use a thermostat device, such, for example, as when the device is to be used on a direct current supply line.

In the embodiment illustrated in Fig. 4, there is provided a fixed contact 45 to which is connected one end of the heating element, as shown at 27, the other terminal 17 of said heating element being connected to a fixed contact 46. Said contacts 45 and 46 are spaced from each other to produce a gap therebetween and both of said contacts are carried on a block of insulating material 47, which block is secured to the underside of the bottom wall of the inner cup 10 in any suitable and well known manner such, for example, as by means of the screws 48 or the like.

Carried by said block 47 is a plunger rod 49, which rod is provided on one end with a head 50 which is of such a size as to readily bridge the gap between the contacts 45 and 46. The other end of said plunger rod is provided with a small head 51 against which is disposed a washer 42 and surrounding the portion of the plunger immediately adjacent the washer 52 is a coil spring 53, said coil spring being partially received in a recess 54 provided in said block and is arranged for normally urging said head 50 away from the contacts 45 and 46.

When the device is assembled a drop of suitable fusible material, as shown at 55, is employed for holding the head 50 in contacting engagement with the contacts 45 and 46, in which position an electric circuit may be completed through the terminal caps 41 to the heating element. However, should the temperature reach such a point where the fusible material 55 is fused or dissolved, the spring 53 will be effective for urging the plunger rod 49 downwardly, as viewed in Fig. 4, thereby moving the head 50 out of engagement with the contacts 45—46, thus interrupting the current supply to the heating element and thereby preventing the same from overheating which would result in injury to the heating cup. If desired, a recess 56 may be provided in the block 47 for receiving the head 50 when the latter is urged to its circuit breaking position by the spring 53.

In this embodiment, it will be noted that the cut off device will again have to be set after the same has been operated to break the circuit to the heating element which may be readily done by disassembling the inner and outer members in the manner hereinbefore described.

On the outer shell of the member 19 are provided a pair of U-shaped ears 57 by means of which a suitable handle (not shown) may be attached to the said outer shell. These ears provide free open spaces both for heat radiation as well as for facilitating in the cleaning of the same.

From the above it will be apparent that I have provided a vessel of the self-heating type especially adapted for use upon one or more well known types of drink mixers which will permit of ready disassembly whenever it becomes necessary or desirable to repair the same and which has associated with it novel and improved automatic means for interrupting the supply of current to the heating element upon certain predetermined temperatures being reached. It will also be noted that the device is further protected against injury to the terminal connections by reason of arcing or the like, thereby greatly increasing the useful life of the device.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claim.

What I claim and desire to secure by Letters Patent of the United States is:

A self-heating cup comprising an inner container, an electric heating element closely applied to the exterior portion of said inner container adjacent the lower portion thereof, an outer shell within which said inner container is adapted to be disposed, said outer shell terminating below the upper free edge of said inner container, a socket disposed within said outer shell, externally threaded hollow members associated with said socket adapted for receiving the terminals of said heating elements therein, fusible material for securing the free ends of said terminals within the hollow members, electric conducting caps having a hollow internally threaded portion disposed over said free ends of said terminals to protect the same from injury due to arcing, and means associated with said heating element and disposed in threaded relation adjacent the lower wall of said inner container for interrupting the supply of current to said heating element upon a certain predetermined temperature being reached.

HERMAN E. LACY.